Patented Sept. 10, 1940

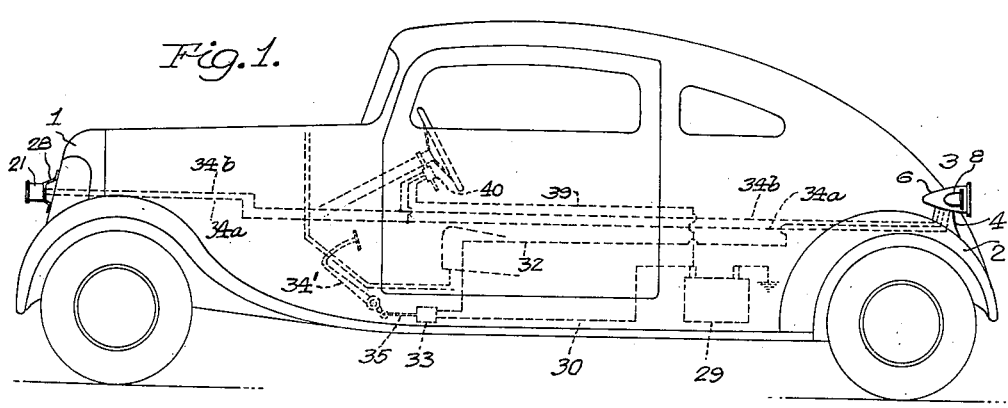

2,214,145

UNITED STATES PATENT OFFICE 2,214,145

SWITCH

Merritt J. Pike, Birmingham, Mich.

Application May 10, 1937, Serial No. 141,621

1 Claim. (Cl. 200—6)

This invention relates generally to switches and more particularly to switches for a signal system for motor vehicles.

An object of the invention is to provide for a motor vehicle signal system a new and improved manually operable switch which is convenient to operate, is simple in construction and may be readily applied to a motor vehicle.

It is also an object to provide a new and improved manually operable switch which may be conveniently mounted upon the steering column in convenient position for operation by the driver and which switch is arranged to be normally spring held in mid position with the current cut off and to be swung to either a right or left hand position to indicate either a right or left hand turn and will be held yieldingly in that position as long as it is desired that such indication be maintained.

It is also an object to provide certain other new and useful features in the construction, arrangement and combination of parts, all as hereinafter more fully described and shown in the accompanying drawing, in which:

Figure 1 is a side elevation of a motor vehicle with the signal system embodying the present invention applied thereto;

Fig. 2 is a front end elevation of the vehicle shown in Fig. 1;

Fig. 3 is a rear end elevation;

Fig. 4 is a plan view of a switch device with a cover of the casing removed and with the casing proper partly in section;

Fig. 5 is a longitudinal section of Fig. 10 with the parts in section, and

Fig. 6 is a wiring diagram for the system showing the several signal lamps and switches connected within the wiring system.

As shown in the accompanying drawing, 1 indicates the usual radiator grill at the front end of the car, and 2, 2, indicate the rear fenders which are usually curved longitudinally and upon which, as shown in Fig. 3, a signal device, indicated as a whole by the numeral 3, is mounted upon each fender by means of a suitable bracket 4 preferably made of sheet metal to provide a hollow support for the lamp casing of the signal device, the lower end or bottom surface of this bracket 4 being curved as at 5 to conform to the curvature of the rear fender to which it is to be secured in any suitable manner.

Each signal device 3 comprises a sheet metal casing 6 preferably having a circular rear end, which end is closed by a glass plate held in place in any suitable manner, and projecting laterally from one side of this casing 6 in a horizontal position and formed integral therewith, is a second casing 8 adapted to hold a lamp 9 with the inner end of the lamp casing projecting through an opening in the wall of the main casing 6 and the front side of which casing 8 is closed by a glass closure plate held in place in any suitable manner and backed up by a thin metal plate at its inner side, which metal plate is formed with a longitudinal opening simulating an arrow to indicate the direction of the turn of the vehicle.

Both casings 6 and 8 are curved forwardly to give a stream line appearance and the casing 6 is provided intermediate its ends with a transverse wall extending across the casing and adapted to form a support therein for a pair of lamps, one above the other, the upper lamp 15 being of greater candle power than the lower lamp 14, so that the lamp 15 when lighted will indicate that the machine is to be brought to a full stop and the lower lamp 14 being simply a tail light which will burn continuously during the travel of the machine at night and when the current is turned on.

A direction signal 20 may be mounted on the front of the vehicle and may comprise an elongated casing 21 having a forwardly facing opening closed by a transparent closure member 22. Within the casing 21, against the closure 22 an opaque sheet of material is provided in which cutouts in the form of oppositely directed arrows 26 are provided. Within the casing 21, a pair of bulbs 27 are suitably supported back of respective arrows. A suitably formed bracket 28 is secured in any suitable manner to the back wall of the casing 21 for supporting the signal device upon the front side of the grill 1 for the radiator. By lighting either one or the other of the lamps 27, the arrow-shaped opening opposite that lamp will be illuminated and the direction in which the vehicle is about to turn will be indicated thereby.

With the forward direction device 20 and the two devices 3 at the rear of the machine secured in place, the lamps in these casings are wired in circuit with the battery 29 of the car indicated in dotted lines in Fig. 1 and symbolically in the diagram shown in Fig. 12. This battery which is the usual storage battery of the car, is grounded to the frame of the car at one end and to its opposite end is connected a circuit wire 30 within which is a switch 31 for opening this circuit, which circuit extends to the rear end of the car and is connected to the lamps 14 which perform the function of a tail light, the circuit being grounded beyond these lamps so that when the switch 31 is closed the lamps will be lighted and remain lighted as long as the switch is closed.

The stop lights 15 within the two signal light casings 6 at the rear end of the car, are connected within a circuit 32 which includes part of the circuit 30 leading to the battery and within this circuit 32 is a switch device indicated as a whole by the numeral 33, this device being of the usual construction as indicated in Fig. 12 for operation by the brake pedal 34' of the car, said device 33 including a rod 35 slidable longitudinally within a suitable casing 36 and carrying a contact member 37 for closing the circuit 32 when the pedal 34' is operated to operate the brakes, the first portion of the movement of said pedal, moving the rod 35 endwise and closing the circuit to light the two stop lights 15 and indicate that the car is slowing down or is going to be stopped by the operation of the brakes.

The direction signal lamps 9 within the two lateral extensions or arms of the signal device 3, are connected within a circuit 34 as are also the two lamps 27 within the casing of the forward signal device 20, the signal lamp 27 at the right hand end of the forward device being electrically connected by a wire 34a of the circuit to the right hand signal lamp 9 of the device 3 at the right hand side at the rear end of the car, and the signal lamp 9 of the device 3 at the left hand side at the rear of the car is connected by the wire 34b running to the lamp 27 at the forward end of the car to give the signal of a left hand turn at both front and rear of the car. Connected across the circuit 34 comprising the wires 34a and 34b, is a switch device indicated as a whole by the numeral 38, which device is operative to control the flow of current through either of these wires by connecting a wire 39 leading from a terminal of the switch 38 to the battery 29.

This switch device 38 is shown in detail in Figs. 10 and 11 and comprises a suitable casing 40 within which is mounted an operating lever 41 projecting from the rear side of the casing and having a head 41a pivotally attached at 42 within said casing, to a terminal plate 43 to which the wire 39 is connected. The head 41a of the switch lever 41 is preferably of substantially hexagonal shape in plan view, and secured to said head over the forward angle or pointed end of said head, is a contact member 44. This head also has flat side surfaces parallel with the longitudinal center line of the handle which line passes through the axis of its pivot, and contact levers 45 and 46 are pivoted at 47 within the casing upon fixed plates 50 within the casing to which plates the wires 34a and 34b are connected, and springs 51 interposed between the outer sides of the levers 45 and 46 and insulating wall 52 at the sides of the casing, normally exert a force to turn the levers 45 and 46 toward each other upon their pivots 47 into engagement with the flat sides of the head 41a of the operating handle 41, which handle is formed of insulating material. Therefore with the operating handle in normal position, as shown, there is no electrical connection between either of the wires 34a and 34b and the wire 39, and the handle lever 41 is held in mid position by the springs 51 with the circuit broken.

When it is desired to indicate a left hand turn, the handle 41 will be swung to the left, bringing its contact 44 into engagement with the contact lever 45 and causing current to flow from the battery through the wire 39 and through the wire 34b to the left hand signal lamps of both the front signal device 20 and the rear signal device 3 at the left hand side of the rear of the car. The spring tension applied to the contact levers 45 and 46, will hold these levers in firm contact with the opposite angular faces of the head 41a of the control lever and thus hold said lever in the position to which it is turned with the left hand signal lights lighted, and will remain in that position until the operator wishes to change the indication. When the operator swings the operating lever or handle 41 to the right, its contact 44 will then be brought into engagement with the contact lever 46 and electrical connection between the wire 34a and the wire 39 will be made to supply current to the lamps 27 and 9, which lamps will then indicate that a right hand turn is to be made. In a like manner the control lever 41 will be held by the spring tension applied to the contact levers 45 and 46 until such time as the operator desires to change the indication when he will touch the handle 41 and throw it to mid position where it will be held by the spring tension applied to the contact levers with all of the signal lights extinguished. The contact member 44 is provided with an extension 44a extending beneath the head of the switch lever 41 and resting in contact with the contact plate 43 which is secured upon an insulating block 53 secured within the bottom of the casing so that said plate 43 is always in electrical connection with the contact member 44.

With this form of switch which may be conveniently mounted upon the steering column of the motor vehicle adjacent the steering wheel, the operating lever 41 will be in a convenient position to be operated and will be normally held in mid position with the circuits controlled thereby open, but whenever it is desired to signal a right or left hand turn of the vehicle, the switch may be thrown to a corresponding position, that is, to the right for a right hand turn and to the left for a left hand turn and said switch lever will remain in the position to which it is thrown until released by the operator. Normally the operator will leave the direction indicating lights in operation after signaling a right or left turn, until such turn is made and then by touching the control lever, it will snap to mid position and the current will be cut off from these signal lamps.

Each of the signal devices at the rear of the car includes a cylindrical casing 6 which is tapered forwardly giving a stream line appearance and is also provided with the laterally extending arm 8 which houses the direction signal. The casing 6 houses two lamps 14 and 15, the lower light 14 being automatically lighted when the switch 31 is closed and the lamp 15 being automatically lighted by the operation of the switch device 33 operated by a movement of the clutch pedal for operating the brakes of the car. Therefore a rear light is provided that is constantly burning during night driving and a signal is always flashed whenever the brake pedal is operated to indicate a slowing down of the car or, when the brake pedal is fully operated, indicating a stopping of the car.

Obviously changes may be made in the particular construction and arrangement of the several devices and in the switches and their connections without departing from the spirit of the present invention and I do not therefore wish to limit myself to the particular construction shown.

Having thus fully described my invention, what I claim is:

A manually operable switch mechanism comprising, a support, a pair of spaced terminal plates mounted on said support, a pair of spaced pivots mounted respectively on said terminal plates, a pair of spaced channel-shaped levers mounted respectively on said pivots, a terminal plate mounted on said support between said levers, an insulated manually operable lever mounted on said second-named terminal plate between said pair of levers, a contact member carried by said manually operable lever and continuously in contact with said second-named terminal plate, said contact member engaging one of said levers upon swinging of said manually operable lever in one direction and engaging the other of said levers upon swinging movement of said manually operable lever in the opposite direction, and spring means mounted respectively on said pivots within said pair of levers and urging said pair of levers toward each other into engagement with said manually operable lever, said manually operable lever having a neutral position with said contact member out of engagement with both of said levers.

MERRITT J. PIKE.